US009892744B1

(12) United States Patent
Salonidis et al.

(10) Patent No.: US 9,892,744 B1
(45) Date of Patent: Feb. 13, 2018

(54) ACOUSTICS BASED ANOMALY DETECTION IN MACHINE ROOMS

(71) Applicant: INTERNATIONAL BUSINESS MACHINES CORPORATION, Armonk, NY (US)

(72) Inventors: Theodoros Salonidis, Boston, MA (US); Dinesh C. Verma, New Castle, NY (US); David A. Wood, III, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/430,771

(22) Filed: Feb. 13, 2017

(51) Int. Cl.
*G10L 25/51* (2013.01)
*G10L 21/10* (2013.01)
*G10L 25/03* (2013.01)

(52) U.S. Cl.
CPC .............. *G10L 25/51* (2013.01); *G10L 21/10* (2013.01); *G10L 25/03* (2013.01)

(58) Field of Classification Search
None
See application file for complete search history.

(56) References Cited

U.S. PATENT DOCUMENTS

| 5,778,791 | A | 7/1998 | Albus et al. |
| 6,507,790 | B1 | 1/2003 | Radomski |
| 7,647,827 | B2 | 1/2010 | Pelecanos et al. |
| 2016/0130114 | A1 | 5/2016 | Wilke et al. |
| 2017/0186124 | A1* | 6/2017 | Jones ..................... G06Q 50/28 |
| 2017/0195810 | A1* | 7/2017 | Gonzales, Jr. ....... G07C 5/0808 |

FOREIGN PATENT DOCUMENTS

FR 2924239 A1 5/2009
JP 2015171210 A 9/2015

OTHER PUBLICATIONS

Benyamin et al., "Acoustic Detection and Tracking of a Class I UAS with a Small Tetrahedral Microphone Array", Army Research Laboratory (ARL-TR_7086), Sep. 2014, pp. 1-34.

(Continued)

*Primary Examiner* — Paul Huber
(74) *Attorney, Agent, or Firm* — Minh-Hien Vo

(57) ABSTRACT

Monitoring a plurality of machines located in an operating environment. First and second acoustic signal readings and their respective detecting locations are received from a sensing device. First and second acoustic signal spatialization map containing characteristic data signatures for the machines are generated based on the first and second acoustic signal readings. One or more differences are determined that exceed a predetermined threshold value, between corresponding characteristic data signatures in each of the first and second acoustic signal spatialization maps. At least one of the machines that are associated with the determined differences is identified. A corrective action to perform on the machine is identified, based on the determined one or more differences. Commands are transmitted to a corrective action module in the operating environment to cause the corrective action module to perform the corrective action.

18 Claims, 8 Drawing Sheets

(56) References Cited

OTHER PUBLICATIONS

Heidarbeigi et al. "Evolving an Artificial Neural Network Classifier for Condition Monitoring of Massy Ferguson Tractor Gearbox." International Journal of Applied Engineering Research, ISSN 0973-4562, vol. 5, No. 12 (2010), pp. 2097-2107.

Saxena et al., "Evolving an Artificial Neural Network Classifier for Condition Monitoring of Rotating Mechanical Systems." Manuscript Accepted for Publication on Aug. 11, 2005 in the Journal of Applied Soft Computing, Elsevier Publishers ISSN: 1568-4946, pp. 1-13.

Magalhaes et al. "Identification of Artificial Neural Network Models for Three-Dimensional Simulation of a Vibration-Acoustic Dynamic System." Open Journal of Acoustics vol. 3, No. 1 (2013), Article ID: 29323, pp. 1-11.

Siemens, "High Definition Acoustic Camera", http://www.plm.automation.siemens,com/en_us/products/lms/testing/test-lab/acoustic/high . . . accessed on Nov. 9, 2016, LMS Testing Solutions—Unrivaled Suite of Solutions for Durability, Noise and Vibration Engineering, pp. 1-2.

Mell et al., "The NIST Definition of Cloud Computing", National Institute of Standards and Technology, Special Publication 800-145, Sep. 2011, pp. 1-7.

Chu et al., "Environmental Sound Recognition With Time-Frequency Audio Features", IEEE Transactions on Audio, Speech, and Language Processing, vol. 17, No. 6, Aug. 2009, pp. 1-17.

William, "Low Complexity Feature Extraction for Classification of Harmonic Signals", Theses and Dissertations from Electrical & Computer Engineering. Paper 24, http://digitalcommons.unl.edu/elecengtheses/24, Sep. 14, 2011, pp. 1-226.

Singh, "Acoustics Based Condition Monitoring", available at http://www.iitg.ernet.in/engfac/rtiwari/resume/sksingh.pdf, Dec. 11, 2008, pp. 1-7.

* cited by examiner

US 9,892,744 B1

ACOUSTICS BASED ANOMALY DETECTION IN MACHINE ROOMS

BACKGROUND

The present invention relates generally to the field of monitoring systems, and more particularly to monitoring and determining a condition of a machine's operation performance.

Various equipment used in many types of buildings are often powered by a number of machines located in what is often referred to as a machine room. Depending on factors such as, for example, the size and nature of use of the building, the machine room may house many machines. In order to ensure proper and reliable function and operation, each of the machines may require frequent monitoring and maintenance.

Some machines may include integrated instrumentation and network communications capability, allowing them to self-monitor and identify conditions relating to their operation performance, such as, for example, conditions relating to degradation or impending issues, and to report out such conditions. These machines may execute self-maintenance or problem-flagging operations as such degradation or impending issues occur, allowing for maintenance action to take place before machine failure can occur. Other machines may not have this capability, and may require certain maintenance practices which might rely on a maintenance technician to identify degradation or impending issues in machine operation performance by detecting human-perceptible indications of such conditions exhibited by the machine, so as to allow for the subsequent performance of maintenance.

It is typical for a number of machines to operate within the same machine room and within close proximity of each other. Such conditions can contribute to obscuring human-perceptible indications of degradation or impending issues in machine operation performance exhibited by any particular machine present in the machine room and can make identifying such indications difficult or impossible. For maintenance practices which might rely on a maintenance technician to identify indications of degradation or impending issues in machine operation performance exhibited by any particular machine, for example, by "listening" to the machines, this may result in such maintenance practices being generally unreliable, and can ultimately put the proper operation of machines, and consequently, those people and organizations dependent on such machines, at risk of unplanned downtime, or otherwise.

It would be advantageous to be able to monitor a number of machines positioned within the same general area as each other in order to identify degradation or impending issues in a machine's operation performance, so as to allow for the performance of targeted machine maintenance well before machine failure can occur.

SUMMARY

Embodiments of the invention are directed to a method, system, and computer program product for monitoring a plurality of machines located in an operating environment. A first acoustic signal readings and their respective detecting locations is received from a sensing device over a network to a computing system. A first acoustic signal spatialization map containing characteristic data signatures is generated by the computing system, based on the first acoustic signal readings and their respective detecting locations, each of the characteristic data signatures being associated with one or more of the plurality of machines. A second acoustic signal readings and their respective detecting locations is received from the sensing device over the network to the computing system. A second acoustic signal spatialization map containing characteristic data signatures is generated by the computing system, based on the second acoustic signal readings and their respective detecting locations, each of the characteristic data signatures being associated with one or more of the plurality of machines. One or more differences is determined by the computing system that exceeds a predetermined threshold value, between one or more characteristic data signatures in the first acoustic signal spatialization map and corresponding one or more characteristic data signatures in the second acoustic signal spatialization map. At least one of the plurality of machines that are associated with the determined differences is identified. A corrective action to perform on a machine of the plurality of machines is identified by the computing system, based on the determined one or more differences in the generated first and second acoustic signal spatialization maps. Commands are transmitted by the computing system to a corrective action module in the operating environment to cause the corrective action module to perform the identified corrective action.

DETAILED DESCRIPTION

For certain types of machines, indications of degradation or impending issues in machine operation performance may occur as machine-emitted acoustic or electromagnetic signals.

Embodiments of the present invention are directed to a monitoring system that monitors machines in a machine room, and which can detect and determine a condition of a machine's operation performance on the basis of machine-emitted acoustic or electromagnetic signals, in order to perform targeted corrective action. In the disclosed embodiments of the present invention, the monitoring system operates in an enclosed environment in which a number of distinct machine-emitted signal sources, as well as other distinct signal sources, may each emit signals, either continuously, periodically, or intermittently. An initial reading of the machine-emitted signals, indicative of a current condition of each of the machines' operation performance, is received, characterized, spatialized and clustered with respect to each of the machines, in order to generate, associate, and index an initial characteristic data signature, in the form of either of a characteristic acoustic signature, or a characteristic electromagnetic signature, to each of the machines, respectively. During machine monitoring, a later reading of the machine-emitted signals is taken, which is also characterized, spatialized, and clustered. Differences in each of a machine's initial and later characteristic data signatures are used as a basis to detect differences in each of the machine's current and later conditions as to its operation performance. Where differences in the characteristic data signatures exceed a predetermined threshold value, indicating a possible degradation or impending issues in the machine's operation performance, corrective action on the machine may be performed.

Figure 1:
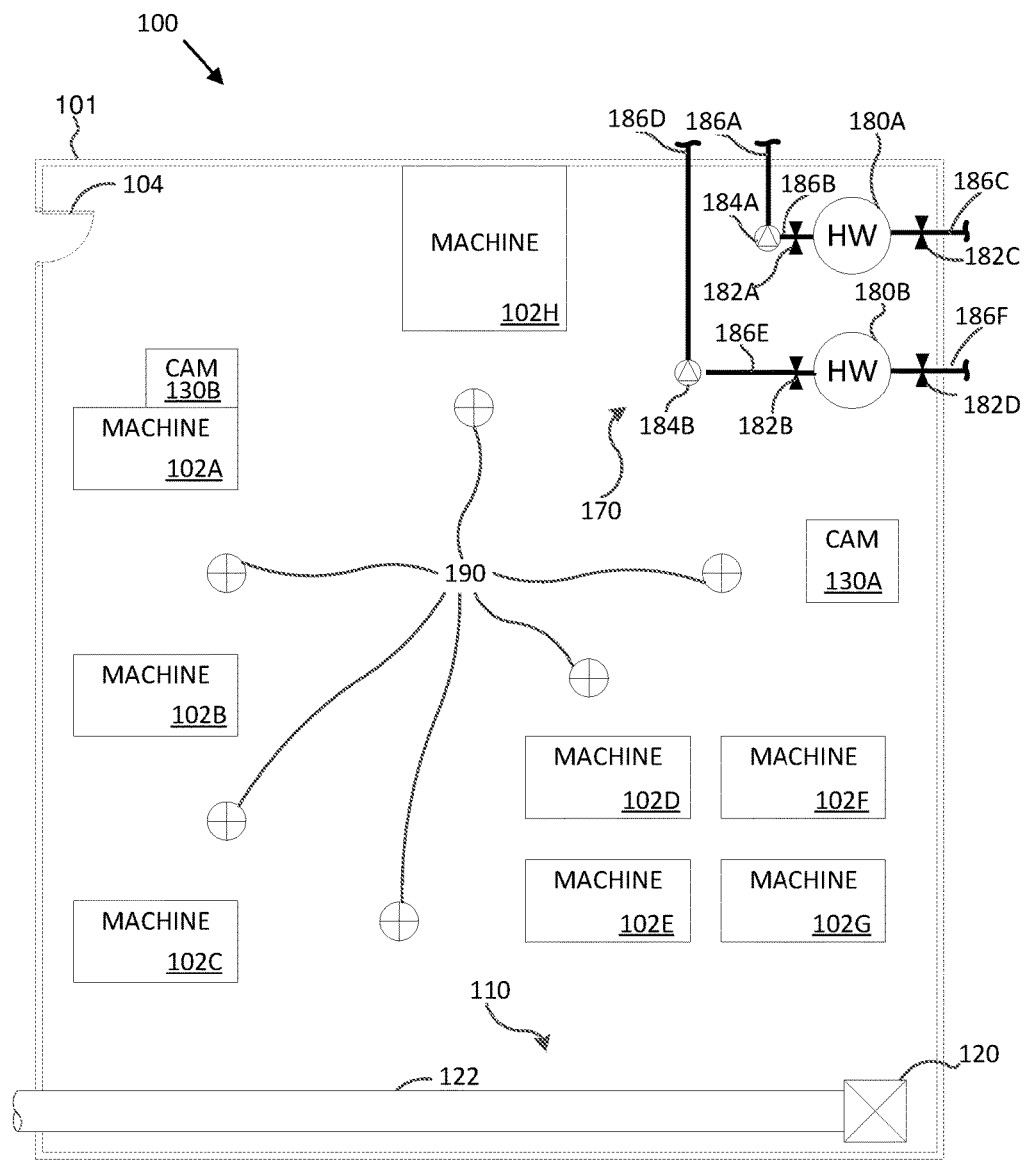
FIG. 1 is a schematic diagram depicting a machine room environment, in accordance with an embodiment of the present invention.

FIG. 1 is a schematic diagram depicting a machine room environment 100, in accordance with an embodiment of the present invention. Machine room environment 100 is defined by the three dimensional space enclosed by the boundaries and walls of machine room enclosure 101, which may include an access door 104. Inside machine room enclosure 101 there may be positioned an air handling unit 110, which may include air handler 120 along with associated distribution ducting 122, a water control and distribution unit 170, which may include water heaters 180A-B along with associated distribution piping 186A-F, fluid flow control elements 182A-D, and fluid conveyance elements 184A-B. Machines 102A-H may also be positioned in the machine room enclosure 101. Data collection points 190, as will be described in further detail below, represent positions in the machine room enclosure 101 from which a sensing unit might collect machine-emitted acoustic signals. CAMs 130A-B, as will be described in further detail below, represent means for performing corrective actions on machines 102A-H.

In an exemplary embodiment of the present invention, machines 102 and certain components of air handling unit 110 and water control and distribution unit 170 represent, for example, machinery, with rotating and/or reciprocating components, used in the operation of a building's power and utility systems. These types of systems might include, for example, power storage or generation systems, cooling and heating systems, or other types of systems, and might involve the use of machines such as, for example, inertial flywheels, transformers, generators, dynamos, alternators, prime movers such as diesel or gasoline engines, motors, turbines, and fluid conveyors and regulators such as pumps, compressors, fans, and valves.

Rotating or reciprocating machines typically produce vibrations and emitted acoustic signals during their operation due to their production of dynamic forces that vary with respect to time, which act both internally within the machines, and externally upon the machines' surrounding environment. These internally and externally acting forces may be affected by factors such as, for example, those relating to an operating environment of the machine, the machine's overall design, the materials used in the machine's construction, and the damping characteristics of the materials used, and may vary from machine to machine. Rotating or reciprocating machines produce vibrations and emitted acoustic signals, which, with continued operation and use, may change in terms of character over time due to, for example, degradation of a machine in the form of "wear and tear" of certain of the machine's components. For these types of machines, observations of the characteristics of the machine's emitted acoustic signals, and the detection of any changes relating to the machine's emitted acoustic signals over time, can be used as a basis for monitoring and determining a condition of the machine's operation performance.

As the condition of the machine's operation performance begins to undergo some degree of degradation, or if the machine fails suddenly, the machine's produced vibrations and emitted acoustic signals may be of a certain character. For example, bearing wear or a loosened power transmission belt of a machine may affect a condition of the machine's operation performance by increasing friction or misalignment between components of the machine, and may cause the machine to undergo some degree of degradation. This degradation may change the character of the machine's produced vibrations and emitted acoustic signals, causing the machine to produce emitted acoustic signals that weren't present before, in the form of, for example, "screeching", "scraping", or "knocking" sounds.

Generally, acoustic signals emitted from various types of machines present in a machine room, as perceived from a position located within the machine room, might range in magnitude from approximately 40-130 dB SPL, and more particularly from approximately 50-105 dB SPL. Depending on the particular types of machines and the machines' nature of use, frequencies of machine-emitted acoustic signals may range from approximately 20 Hz-24 kHz.

In an exemplary embodiment of the present invention, the characteristics of machine-emitted acoustic signals in and of machine room enclosure 101, as perceived from a particular position inside machine room enclosure 101, may be affected by, for example, the operation and positioning of any of machines 102, certain components of air handling unit 110, and certain components of water control and distribution unit 170, as well as the physical boundaries of machine room enclosure 101. The machines may operate continuously, periodically, or intermittently due to reasons relating to, for example, demands for electrical power, climate and temperature control, or to supply and regulate the flow of utilities. For example, the operation of a generator might be continuous, or only occur during times when electrical power from a power grid is insufficient for a user's needs, and additional power is required. Fluid flow through distribution ducting 122 or distribution piping 186 may become turbulent as a result of sudden changes in fluid pressure caused by the opening, closing, or throttling of valves or other fluid flow regulators such as fluid flow control elements 182, or the starting and stopping of operation of one or more pumps such as any of fluid conveyance elements 184, where such turbulent fluid flow through distribution ducting 122 or distribution piping 186 might cause them to vibrate and emit acoustic signals.

The boundaries and walls of machine room enclosure 101, including access door 104, as well as the machines and other structures or objects that may be present, act as physical objects with which the machine-emitted acoustic signals may impinge, altering the characteristics of such signals by causing various levels of acoustic signal diffraction, reflection, absorption, and dissipation to occur as a function of time and space. This can have the effect, among others, of introducing phase changes to, or otherwise changing the characteristics of, the signals.

In various embodiments of the present invention, machines 102 represent machinery used in the operation of one or more of a manufacturing facility's manufacturing or fabrication systems, such as, for example, a plant floor, or a machine shop. These types of systems might include, for example, subtractive or additive manufacturing systems, and other types of systems, and might involve the use of machines, such as, for example, drills, lathes, polishers, sanders, augers, pick-and-place robots, prime movers such as motors, fluid conveyors and regulators such as pumps, compressors, and valves, vacuum deposition and other types of material deposition machines, wet- or dry-cleaning machines, 3D printers, and other types of injection, extrusion, or die moulding machines. These types of machines may operate continuously, periodically, or intermittently due to reasons relating to, for example, production demands or standard product workflow.

Figure 2:
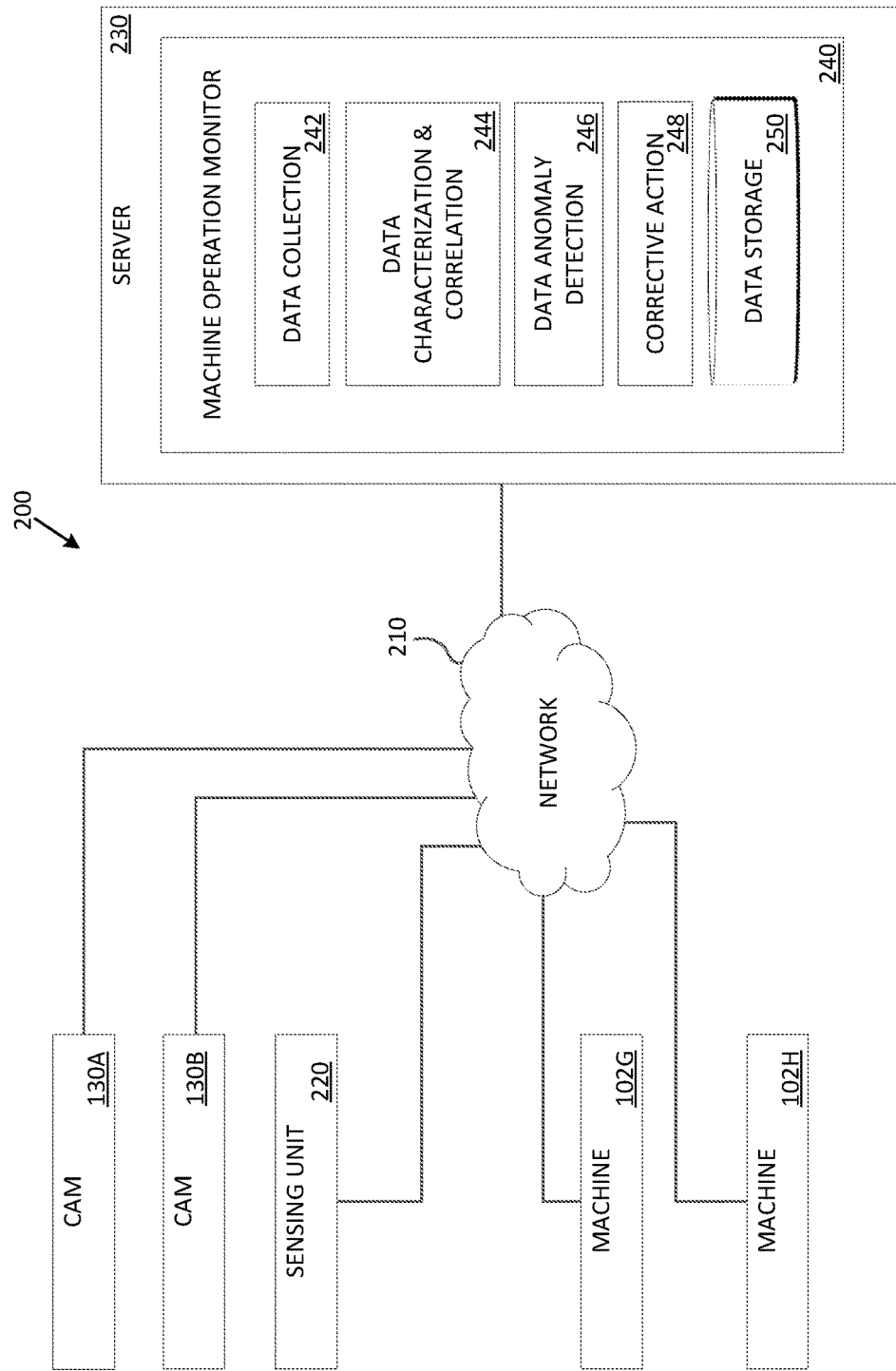
FIG. 2 is a functional block diagram depicting a machine operation monitoring system, in accordance with an embodiment of the present invention.

FIG. 2 is a functional block diagram depicting a machine operation monitoring system 200, in accordance with an embodiment of the present invention. Machine operation monitoring system 200 includes machines 102G-H, sensing unit 220, CAMs 130A-B, and server 230, all interconnected over a network 210.

In various embodiments of the present invention, network 210 can be, for example, an intranet, a local area network (LAN), a wide area network (WAN) such as the Internet, and include wired, wireless, or fiber optic connections. In general, network 210 can be any combination of connections and protocols that will support communications between sensing unit 220, each of machines 102G-H, and server 230, in accordance with an embodiment of the invention.

Server 230 represents a computing platform that hosts machine operation monitor program 240. Server 230 may include internal and external hardware components as depicted and described in further detail below with reference to FIG. 6, below. In other embodiments, the computing system may be implemented in a cloud computing environment, as described in relation to FIGS. 7 and 8, below.

In an exemplary embodiment of the present invention, machines 102G-H represent, for example, machines which may include integrated instrumentation and network communications capability, as well as computing resources, allowing machines 102G-H to self-monitor and identify conditions relating to their operation performance, and to process and communicate data relating to such conditions over a network to a centralized control system so as to allow for a determination to be made as to any required corrective action that should be performed. The self-monitoring and maintenance capability of each of machines 102G-H may use control systems, such as, for example, modularized control systems, which may include, for example, integrated components or controllers of a wired or wireless, network-connected, supervisory control and data acquisition (SCADA) system, or by a distributed control system (DCS).

Regardless of the machines' integrated instrumentation and network communications capability, all machines 102A-H may be monitored by sensing unit 220 of machine operation monitoring system 200. For machines such as machines 102G-H, which may already have self-monitoring and maintenance capability, monitoring by sensing unit 220 of machine operation monitoring system 200 may provide redundancies in the monitoring of these types of machines, and may enhance their operational reliability, by functioning as an auxiliary monitoring system.

In an exemplary embodiment, sensing unit 220 represents a device which detects or takes readings of acoustic signals. The sensing unit 220 includes a sensor to receive and sample, or otherwise allow for the sensing unit 220 to take readings of acoustic signals. Generally, the sensor may take on any form, including, for example, a capacitive form, a microelectrical mechanical system form, a piezoelectric form, a fiber optic form, and the like, and may enable measurement of a physical quantity or form of acoustic energy in the environment of the device, such as, for example, one or more mechanical time-varying propagating acoustic waves. The sensor may produce data and information representative of the physical quantity or form of energy measured. The sensing unit 220 may include internal and external hardware components as depicted and described in further detail below with reference to FIG. 5, allowing it to detect acoustic energy, to produce, for example, an analog electrical signal according to the detected acoustic energy, and to process the analog signal to generate digital data packets otherwise known as network packets, packets, or units of data. The sensing unit 220 may include network communications capability, allowing it to transmit the generated data packets over a network to a computing unit.

Generally, data packets generated by sensing unit 220 may include metadata. For example, the metadata might include time and date information relating to particular detected acoustic signals, and information concerning the spatial position and orientation of the sensing unit 220, as will be described in further detail below.

In various embodiments of the present invention, sensing unit 220 may represent a device, such as, for example, a sound level meter, a noise dosimeter, or any other device capable of detecting acoustic signals. The sensing unit 220 may include an acoustic sensor, such as, for example, a microphone. Generally, the sampling rate and dynamic range characteristics of the sensing unit 220 may be chosen to accommodate the types of machines 102A-H to be monitored, according to the character of the machine-emitted signals emitted by each of the machines 102A-H. For example, the sampling rate and dynamic range characteristics of the sensing unit 220 may be chosen so as to allow for sampling of received signals at sampling rates of, for example, between approximately 20 Hz-48 kHz, for acoustic signals ranging in magnitude, for example, between approximately 40 db SPL-130 db SPL.

In an exemplary embodiment of the present invention, sensing unit 220 represents a device, such as, for example, a mobile phone or smart phone, for example, a mobile phone as described in connection with FIG. 5. The sensing unit 220 may include numerous sensors including, for example, microphone 842, electromagnetic interference (EMI) sensor 844, camera 846, and other sensing units 848. Generally, the sensing unit 220 may include an acoustic sensor, such as, for example, microphone 842, which may allow the sensing unit 220 to receive and sample, or otherwise allow for the sensing unit 220 to take readings of acoustic signals. The sensing unit 220 may be, for example, an IPHONE®, manufactured and sold by APPLE®, Inc. of Cupertino, Calif. The sampling rate and dynamic range characteristics of the sensing unit 220 may generally be chosen to accommodate the types of machines to be monitored according to the character of their machine-emitted signals, as previously described.

Data collection points 190, as depicted in FIG. 1, represent positions within machine room enclosure 101 at which sensing unit 220 may take readings of acoustic signals, for use in generating acoustic signal spatialization maps, or representations of an operating environment such as machine room enclosure 101. Generally, acoustic signal spatialization maps may contain information relating to the characteristics of acoustic signals emitted by each of the machines being monitored and other acoustic signal sources, information relating to the physical locations of each of the machines being monitored, and information relating to the physical locations of the other acoustic signal sources, as will be described in further detail below.

Although FIG. 1 is a two-dimensional plan view of machine room enclosure 101, it should be understood that data collection points 190 are usually distributed within operating environments defined by three-dimensional space. Spatial positioning and orientation of the sensing unit at a number of different positions may have the effect of reducing the impact that signal interference may have on generated acoustic signal spatialization maps of machine room enclosure 101, and on monitoring of machines present in machine room enclosure 101.

In various embodiments, sensing unit 220 may, for example, take acoustic readings at data collection points 190 for 0.5 to 1 second. The data collection points 190 may advantageously be positioned so as to allow for the sensing unit 220 to receive machine-emitted acoustic signals from each of the machines being monitored. For example, for a three-dimensional space such as the space defined by machine room enclosure 101, the sensing unit 220 may be positioned at increasing distances from some reference point such as access door 104, at equally-spaced, in-line positions, spanning the length, width, and height of the space, where the number of the positions may be divided equally amongst lines of positions that project into the space at evenly distributed angles with respect to the horizontal and vertical.

In various embodiments of the present invention, a determination as to both positioning, and a number of positions at which sensing unit 220 takes acoustic signal readings may be determined heuristically. For example, by observing the relationship between accuracies of representation by a number of generated acoustic signal spatialization maps, and the respective positioning and number of positions at which acoustic signal readings were taken.

In an exemplary embodiment of the present invention, acoustic signal readings by sensing unit 220 may be performed initially to produce a high accuracy spatialization map. In an exemplary embodiment, between 6 and 60 acoustic signal readings may be taken by sensing unit 220 for this initial phase. In later monitoring phases, fewer acoustic readings may be taken, for example, as few as two. However, as described in more detail below, taking fewer acoustic readings may produce a less accurate spatialization map. Generally, the data collection points 190 at which sensing unit 220 takes acoustic signal readings should allow for the received acoustic signals to include machine-emitted acoustic signals from each of the monitored machines.

In an exemplary embodiment of the present invention, spatial positioning and orientation of sensing unit 220 may be controlled by mounting the sensing unit 220 to a mobile platform. The mobile platform may be autonomous, and controlled, for example, by an onboard or remote control system. For autonomous mobile platforms, control may be effected, for example, by way of a controller and one or more sensors, such as, for example, sensor motes, of the autonomous mobile platform. The controller may be incorporated into sensing unit 220, or may be a commercial off-the-shelf controller that may be designed to operate in conjunction with the mobile platform. The controller may enable robotic mapping and navigation of machine room enclosure 101, by way of computational algorithms such as, for example, simultaneous localization and mapping (SLAM) algorithms. This machine room mapping may enable the mobile platform to avoid obstacles when moving within machine room enclosure 101, when given commands to travel from one position to another, for example, to allow for the sensing unit 220 to receive signals at different points in space. An example of an implementation of such a control system is the ROOMBA® vacuum cleaner, manufactured and sold by IROBOT®, of Bedford, Mass., U.S.A.

The mobile platform may take on various forms, such as, for example, a land-based wheeled or limbed vehicle, or an aerial vehicle or "drone". The mobile platform may also take on the form of a robotic arm, which may be attached to, for example, a wall, floor, or ceiling, or to a gantry or railing structure, of machine room enclosure 101. In various embodiments of the present invention, the mobile platform may take on a form which may be some combination of the embodiments described above.

In various embodiments of the present invention, spatial positioning and orientation of sensing unit 220 may be performed by way of manual positioning by, for example, a maintenance technician. For example, the maintenance technician may position the sensing unit 220 with his or her hand, or attach the sensing unit 220 to, for example, a boom, rod, or other apparatus, for handling and positioning.

Corrective action modules (CAMs) 130A-B represent devices which perform corrective action on monitored machines. CAMs 130A-B may include internal and external hardware components, as well as network communications components, as depicted and described in further detail below with reference to FIG. 5, allowing them to receive commands from server 230, as will be described in further detail below. CAMs 130A-B may include one or more onboard or remote control systems, as previously described in connection with autonomous spatial positioning and orientation of sensing unit 220, allowing them to execute and perform corrective actions according to received commands, as will be described in further detail below. CAM 130A may include navigation capability, allowing for selective mobile positioning of CAM 130A according to received commands. CAMs 130A-B may include one or more rotatably and/or pivotally attached, cantilevered robotic arms with a number of degrees of freedom, usable to perform corrective action. The one or more robotic arms of the devices may include one or more end effectors, or components usable for grasping, gripping, or otherwise manipulating a machine part, and may also include, for example, one or more electrical or electromechanical devices usable for interfacing, or otherwise interacting, with a machine, such as, for example, by way of radio-frequency communication. Generally, means to perform corrective action by CAMs 130A-B may take on any form that might allow for physical or other interaction with monitored machines.

In an exemplary embodiment of the present invention, CAM 130A represents a mobile device. An example of the mobile device is the KUKA® Mobile Robot intelligent industrial work assistant (KMR iiwa) mobile robot, manufactured and sold by KUKA® Robotics Corporation of Augsburg, Bavaria, Germany. As depicted, CAM 130B represents a device which may, for example, be rotatably and/or pivotally attached to a machine, such as, for example, machine 102A, as depicted in FIG. 1. An example of the CAM 130B is the lightweight robot intelligent industrial work assistant (LBR iiwa robot), manufactured and sold by KUKA® Robotics Corporation of Augsburg, Bavaria, Germany.

Corrective action performed by CAMs 130A-B may take the form of, for example, lubrication of a machine's bearings or other parts, fastening or replacement of loosened connections between parts or portions of the machine, varying of the machine's operating parameters, such as, for example, varying a drive motor output speed of the machine, or shutting the machine down. Other forms of corrective action might involve, for example, electrical or radio-frequency communication with the machine or components of the machine, so as to vary or control, for example, factors relating to any of the machine's operational parameters. Such corrective action might involve, for example, lubricating one or more components of the machine by opening and closing a valve of the machine, or varying a drive motor output speed of the machine. CAMs 130A-B may include trouble ticketing systems or software database logging systems, which may be communicated between each of CAMs 130A-B, in which a corrective action to be performed may be noted and stored, in order to allow for later performance of the corrective action. For example, CAMs 130A-B may note and store corrective actions to be performed at a later time, when commands regarding the corrective actions are received at a time when CAMs 130A-B are occupied with the performance of other corrective actions. Generally, a corrective action may involve any action or sequence of actions that affect a machine's operation performance, with respect to, for example, maximizing efficiency or reliability, or minimizing unscheduled downtime.

Machine operation monitor program 240, residing on server 230, represents a computer program which receives and processes data generated by sensing unit 220 to determine conditions as to operation performance of each machine being monitored, and to determine and generate commands to perform corrective action on any of the machines being monitored, accordingly. Machine operation monitor program 240 includes data collection module 242, data characterization and correlation module 244, data anomaly detection module 246, corrective action module 248, and data storage 250.

Data collection module 242 receives acoustic signal reading data from sensing unit 220, for example, in the form of data packets received from sensing unit 220 over network 210, and stores each acoustic reading in data storage 250 in the form of, for example, separate data files. Generally, each acoustic reading data file contains signal data, as well as corresponding metadata, as previously described. For example, data collection module 242 may receive and store sixty individual acoustic readings, corresponding to sixty readings taken by the sensing unit 220 at sixty distinct data collection points 190 and orientations within machine room enclosure 101.

Data characterization and correlation module 244 receives sets of acoustic reading data files for an initial phase and a later monitoring phase, and, for each set of acoustic reading data files, generates an acoustic signal spatialization map which includes characteristic data signatures for each monitored machine 102, and an associated location of each machine in machine room enclosure 101.

Figure 3:
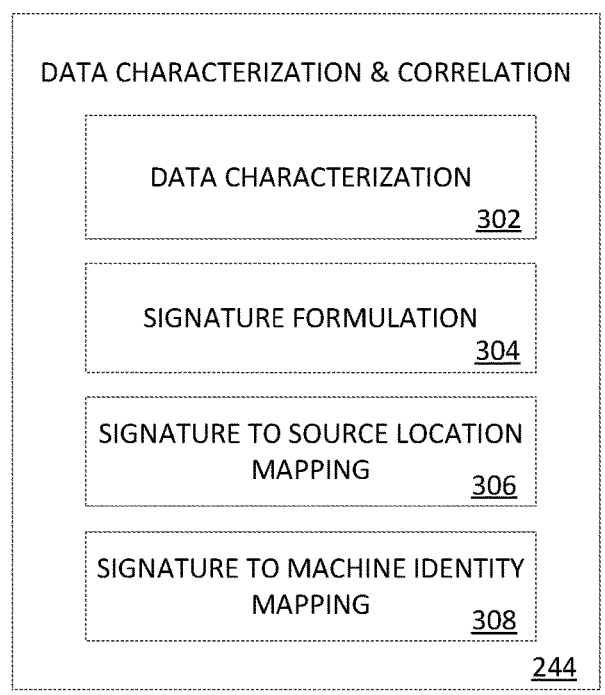
FIG. 3 is a functional block diagram depicting a data characterization and correlation module of FIG. 2, in accordance with an embodiment of the present invention.

FIG. 3 is a functional block diagram depicting the data characterization and correlation module 244 of FIG. 2, in accordance with an embodiment of the present invention. Data characterization and correlation module 244 includes data characterization program 302, signature formulation program 304, signature to source location mapping program 306, and signature to machine identity mapping program 308.

Data characterization program 302 receives sets of acoustic reading data files, each data file containing signal data and metadata, as previously described, and performs digital signal processing on the signal data and metadata contained in each acoustic reading data file to produce characterized signal data. Data characterization program 302 may perform various types of computations in order to characterize the signal data in terms of one or more time- and/or frequency-domain characteristics of the signal data, or temporal and/or spectral features of the signal data, respectively. Signal data may also be characterized with the time- and/or frequency-domain characteristics, in terms of one or more time-frequency domain characteristics, and/or in terms of one or more statistical measurements. The statistical measurements may be based on the signal data, or based on any of the time- and/or frequency-domain characteristics, or time-frequency domain characteristics of the signal data.

The computations performed by data characterization program 302 may use one or more algorithms, either individually or in combination, to compute and produce time-domain characteristics, frequency-domain characteristics, time-frequency domain characteristics, and/or statistical measurements, with respect to signal data, representative of acoustic or electromagnetic signals. The algorithms may consist of, or involve the use of, various types of transforms and other types of calculations, which may include, for example, either individually or in combination, any of the Laplace transform, Fourier transform (FT), fast Fourier Transform (FFT), discrete Fourier transform (DFT), discrete sine transform (DST), discrete cosine transform (DCT), discrete wavelet transform (DWT), Mel-frequency cepstrum (MFC), Mel-frequency cepstral coefficients (MFCCs), linear prediction cepstral coefficients (LPCCs), and/or analog-to-information (ATI). Other computations, either individually or in combination, may involve the use of sparse approximation algorithms, such as, for example, matching pursuit (MP), basis pursuit (BP), or orthogonal matching pursuit (OMP) algorithms or their variants. Other computations, either individually or in combination, may involve the use of algorithms to compute the short-time energy, short-time average zero-crossing rate, and/or time-domain harmonics amplitudes (TDHA) of the signal data. Other computations, either individually or in combination, may involve the use of algorithms to compute the signal energy, mean, variance, skewness, kurtosis, and the like, of the signal data. Generally, any types of algorithms may be implemented that may allow for the representation of the signal data in terms of a number of time-domain characteristics, frequency-domain characteristics, time-frequency domain characteristics, and/or statistical measurements, where the choice of any particular algorithm or group of algorithms to be used may be a matter of design choice.

Signature formulation program 304 receives acoustic reading data files containing characterized signal data from data characterization program 302, and performs digital signal processing on the characterized signal data in order to generate, associate, and index individual characteristic data signatures contained in each acoustic reading data file. Generally, the signal data includes contributions from a number of distinct acoustic signals, emitted from a variety of distinct acoustic signal sources. As a result, there may be a number of time-domain characteristics, frequency-domain characteristics, and/or time-frequency domain characteristics of the characterized signal data that may be used by signature formulation program 304 to define and generate each characteristic data signature. The appropriate choice of these features may be advantageous in building a robust recognition system.

The computations performed by signature formulation program 304 may use one or more algorithms, either individually or in combination, to classify characterized signal data in terms of one or more produced time-domain characteristics, frequency-domain characteristics, time-frequency domain characteristics, and/or statistical measurements with respect to characterized signal data. Classified characterized signal data may form the bases for the definition and generation of each characteristic data signature, so as to allow for the identification and distinction of each individual machine-emitted signal represented by the characterized signal data. The algorithms may consist of, or involve the use of, various types of signal classification algorithms, feedforward neural networks, and/or other types of classifiers or estimation techniques, which may include, for example, either individually or in combination, maximum likelihood estimation (MLE), maximum a posteriori probability (MAP) estimation, harmonic signal classifiers, and/or classifiers based on a modified version of the MP decomposition algorithm. Generally, any types of algorithms may be implemented that may allow for the classification of characterized signal data in terms of one or more produced time-domain characteristics, frequency-domain characteristics, time-frequency domain characteristics, and/or statistical measurements with respect to characterized signal data, where the choice of any particular algorithm or group of algorithms may be a matter of design choice.

Signature to source location mapping program 306 spatializes characteristic data signatures, and may operate in parallel with signature formulation program 304. Spatialization may involve performing sound localization computations using the signal data and metadata associated with each characteristic data signature belonging to a set of characteristic data signatures, generated according to a respective set of acoustic signal readings taken by the sensing unit 220, for example, as in the set of acoustic signal readings used to generate an initial acoustic signal spatialization map, as previously described. Sound localization computations may involve detecting differences in the signal data and metadata associated with individual acoustic signal readings by the sensing unit 220 at distinct positions and orientations, in terms of, for example, differences in the magnitude of the acoustic signal readings, and the corresponding position and orientation at which the signals were detected by the sensing unit 220. The sound localization computations may involve the use of one or more algorithms, such as, for example, algorithms which implement an adapted form of a generalized cross-correlation, which may use detected differences in the magnitude of detected signals and corresponding positions and orientations of detection of the signals, to localize acoustic signal sources.

Signature to machine identity mapping program 308 receives spatialized characteristic data signatures and associates each of the spatialized characteristic data signatures with a unique identity or label, respectively. Generally, each spatialized characteristic data signature corresponding to a location of a machine to be monitored may be associated with a unique identity in the form of, for example, a machine identifier, such as, for example, a serial number of the machine known to be operating at the location coinciding with the location of the spatialized characteristic data signature. For example, information relating to a serial number of a machine, as well as the machine's particular location, may be referenced from a database, or provided by way of user input, according to the corresponding location of a spatialized characteristic data signature, and assigned accordingly for each spatialized characteristic data signature. Signature to machine identity mapping program 308 may additionally associate with each spatialized characteristic data signature information relating to locations of signal sources corresponding to each spatialized characteristic data signature, respectively.

Spatialized characteristic data signatures may collectively form acoustic signal spatialization maps, as previously described. Spatialized characteristic data signatures may be represented by acoustic signal spatialization maps in the form of one or more arrays or matrices which may include, for example, numerical values representative of each spatialized characteristic data signature, respectively, where each numerical values may populate the rows and columns of the matrices or arrays.

Returning to FIG. 2, data anomaly detection module 246 receives the acoustic signal spatialization maps generated by signature to machine identity mapping program 308.

Data anomaly detection module 246 receives and compares acoustic signal spatialization maps, generated based on sets of acoustic reading data files, for example, acoustic reading data files for an initial phase and a later monitoring phase, as previously described, to detect differences between corresponding characteristic data signatures contained in each of the acoustic signal spatialization maps, respectively, which exceed a predetermined threshold value. Data anomaly detection module 246 may detect differences in corresponding characteristic data signatures by comparing corresponding pairs of acoustic signal spatialization maps, and computing differences in numerical values, as previously described, representative of the corresponding characteristic data signatures.

Where an initial phase acoustic signal spatialization map is based on a greater number of acoustic reading data files, for example, sixty acoustic reading data files, and a corresponding monitoring phase acoustic signal spatialization map is based on a fewer number of acoustic reading data files, for example, two acoustic reading data files, a detected data anomaly may not be accurately spatialized to a particular machine in the initial phase acoustic signal spatialization map. Rather, data anomaly detection module 246 may spatialize the data anomaly to a group of machines in a larger area in the acoustic signal spatialization map. For example, where a machine, for example, machine 102G, as depicted in FIG. 1, may be the actual source of a detected data anomaly, data anomaly detection module 246 may spatialize the data anomaly to two or more machines, for example, machines 102D-G. It may, however, be more time-effective to take a few acoustic readings, for example, two or three, during a monitoring phase to determine if an anomaly exists, and if so, take additional readings for the area of machine room enclosure 101 in which the anomaly was spatialized in order to get a more accurate spatialization to a particular machine 102.

In an exemplary embodiment of the present invention, corrective action module 248 represents machine-readable program instructions of machine operation monitor program 240 that receives output from data anomaly detection module 246 and determines or identifies an appropriate corrective action to be performed on a monitored machine based on the received output. A particular corrective action to be performed may depend on the extent and nature of differences between sets of current and corresponding later characteristic data signatures, as previously described. For example, machine-emitted acoustic signals indicative of a wearing bearing, as identified by data anomaly detection module 246, may cause corrective action module 248 to determine and communicate an appropriate corrective action to perform on the machine to either of CAMs 130A-B, where such corrective action might involve, for example, lubrication of the wearing bearing, or deactivation of the machine, by either of CAMs 130A-B.

Data storage 250 may operate to store all data regarding characterized data signatures, as well as associated data and other related data, for retrieval and use by machine operation monitor program 240 and any of its associated modules.

Figure 4:
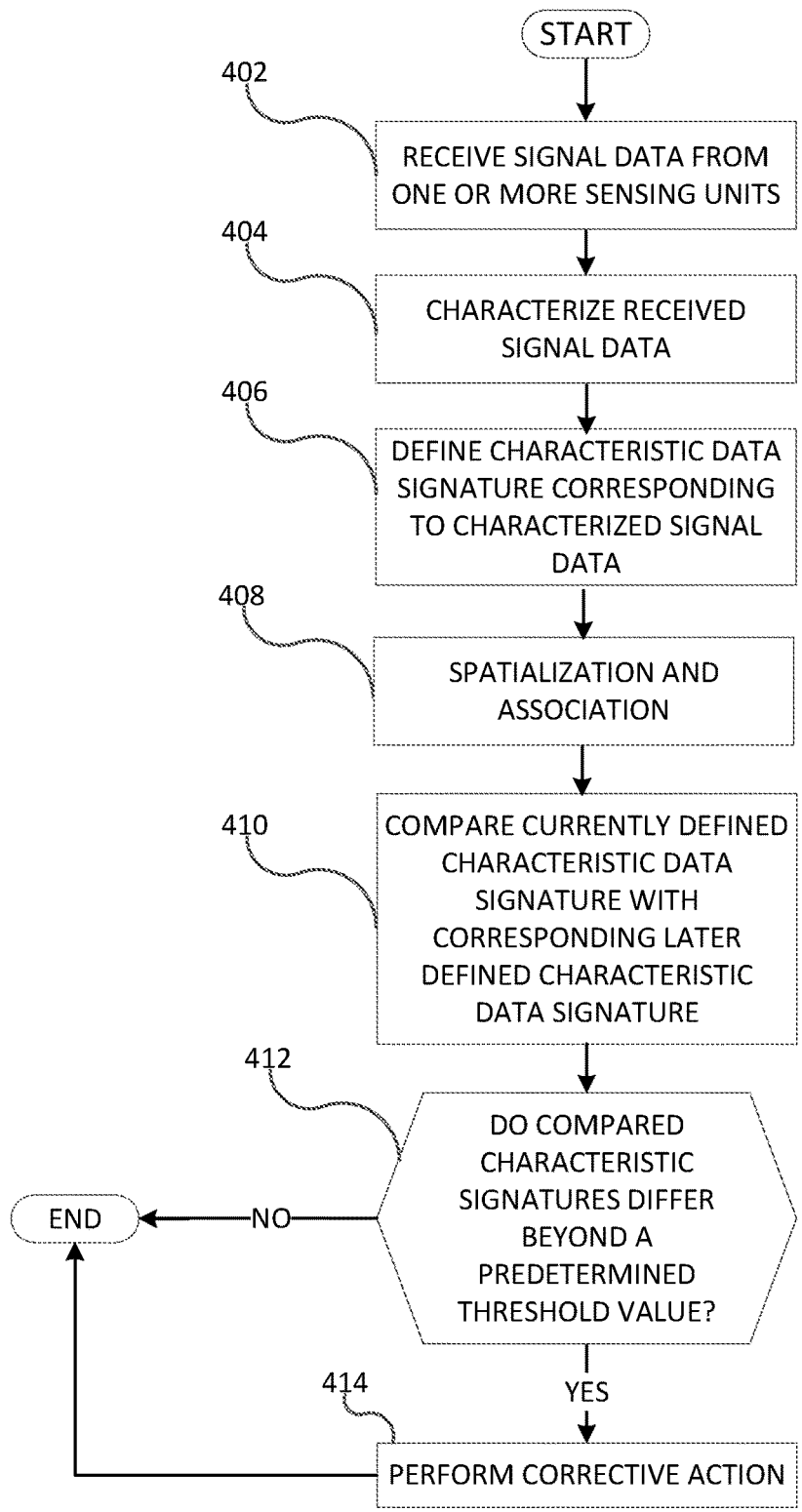
FIG. 4 is a flowchart depicting the operational steps of an aspect of the machine operation monitor program of FIG. 2, in accordance with an embodiment of the present invention.

FIG. 4 is a flowchart illustrating the operational steps of an aspect of machine operation monitoring system 200 of FIG. 2, in accordance with an embodiment of the present invention.

Data collection module 242 of machine operation monitor program 240, residing on server 230, receives signal data and metadata over network 210 from sensing unit 220, in the form of, for example, data packets (step 402). Data collection module 242 may store received data packets in the form of separate computer-readable files on data storage 250 for later retrieval.

Data characterization program 302, of data characterization and correlation module 244, receives signal data and metadata from data collection module 242, and generates characterized signal data accordingly, in terms of a number of temporal and/or spectral features of the signal data, in order to identify and distinguish between each distinct acoustic signal composing the received signal data (step 404). Data characterization and correlation module 244 may further associate and index such temporal and spectral features with the produced characterized signal data.

Signature formulation program 304 receives characterized signal data, and defines and generates characteristic data signatures according to a number of the produced temporal and spectral features of the characterized signal data, by using certain temporal and/or spectral features of the received characterized signal data (step 406). Signature formulation program 304 may associate and index the selected temporal and/or spectral features to the defined characteristic data signatures for further processing.

Signature to source location mapping program 306 spatializes each characteristic data signature by using signal data and metadata associated with each of the characteristic data signatures, to determine physical locations of acoustic signal sources corresponding to each of the characteristic data signatures (step 408). Signature to source location mapping program 306 may associate, cluster, and index such spatialization data to the characterized data signature accordingly. Signature to machine identity mapping program 308 may associate spatialized characteristic data signatures with particular machine identities.

Data anomaly detection module 246 receives and compares first defined characteristic data signatures with corresponding, second defined characteristic data signatures, in the form of corresponding acoustic signal spatialization maps, as received from data characterization and correlation module 244 (step 410). Data anomaly detection module 246 detects differences between characteristic data signatures on the bases of one or more temporal and/or spectral features of the corresponding characteristic data signatures that exceed a predetermined threshold (step 412). For compared characteristic data signatures that do not differ beyond a predetermined threshold value, no corrective action may be performed.

Corrective action module 248 receives detected differences between characteristic data signatures that exceed a predetermined threshold, and generates and communicates commands to, for example, either of CAMs 130A-B, to execute and perform corrective action on a machine of the monitored machines 102A-H, accordingly (step 414), with respect to conditions as to operation performance of the machine.

In alternative embodiments of the present invention, machines 102, as depicted in FIG. 1, may be machines which emit detectable electromagnetic radiation or signals (EMF) which may be characterized to generate corresponding characterized data signatures, as previously described. Similar to above, these characterized data signatures can be used to generate EMF signal spatialization maps. The machines may be, for example, servers, network routers, network switches, and the like, which may operate, for example, in a data processing environment, such as a computer room of a data center. In another example, the machines may be recording boards, mixing consoles, sound amplifiers, recording devices, etc., which may operate, for example, as a recording studio. The machines may include electrical components, such as, for example, integrated circuits, printed circuit boards, and the like, and may further include various types of active electrical component such as, for example, transistors, resistors, diodes, and the like.

Generally, these types of machines may emit electromagnetic radiation or signals due to the nature of their operation. The nature of emitted electromagnetic signals from these types of machines may be affected by factors such as, for example, those relating to an operating environment of a machine, the machine's overall design, the materials used in the machine's construction, and may vary from machine to machine. These types of machines may produce and emit electromagnetic signals which, with continued operation and use, may change in terms of character over time due to, for example, degradation of a machine in the form of "wear and tear" of certain of the machine's components, such as, for example, one or more electrical components of the machine, as previously described. For these types of machines, the detection and characterization of machine-emitted electromagnetic signals, and any changes relating to the machine-emitted electromagnetic signals over time, can be used as a basis for monitoring and determining conditions of a machine's operation performance.

In these embodiments, the sensing unit 220 represents a device which detects electromagnetic signals. The sensing unit 220 may represent a device such as, for example, an electromagnetic radiation meter, which may include, for example, one or more antennae, which may be integrated into EMI sensor 844, allowing the sensing unit 220 to receive and sample, or otherwise allow for the sensing unit 220 to take readings of electromagnetic signals. Generally, the one or more antennae may be any electrical device which receives and converts one or more electromagnetic signals into electrical power, which may be amplified and measured by the sensing unit 220. The sensing unit 220 may include internal and external hardware components as depicted and described in further detail below with reference to FIG. 5, allowing it to detect electromagnetic energy, and to produce, for example, an analog electrical signal according to the detected electromagnetic energy, and to process the analog signal to generate digital data packets. The sensing unit 220 may include network communications capability, allowing it to transmit the generated data packets over a network, such as network 210, to a computing unit, such as server 230. The sensing unit 220 may be capable of detecting electromagnetic signals in the range of, for example, 100 kHz-100 GHz. The sensing unit 220 may be, for example, a Nardalert S3 Mainframe ultra-wideband electromagnetic radiation monitor, manufactured and sold by Narda Safety Test Solutions GmbH, a subsidiary of L3 Communications Holdings, of New York City, N.Y.

Data packets generated by sensing unit 220 may be received by machine operation monitor program 240, residing on server 230, in order to allow for the determination and generation of commands relating to corrective action to be performed, as previously described. In these embodiments, the performance of corrective action may take the form of commands executable by a machine in order to shut down the machine, generated and sent by machine operation monitor program 240 accordingly.

In other alternative embodiments of the present invention, machines 102 may operate while partially or completely submerged in a liquid, and may be used in various types of excavation, mining, mineral retrieval, mineral processing systems, and the like. The machines might include, or operate as part of, for example, oil or offshore platforms, heat exchanging machines, hydrocarbon extraction machines, clarifiers, flotation machines, machines used in hydraulic fracturing, and the like.

In these embodiments, the sensing unit 220 may represent a device which detects acoustic signals, as previously described, with the exception that the sensing unit may further be adapted for use while submerged in a liquid, such as water. The sensing unit 220 may be, for example, a 100-800 kHz differential underwater acoustic emissions sensor, manufactured and sold by PHYSICAL ACOUSTICS®, of Princeton Junction, N.J.

Spatial positioning and orientation of sensing unit 220 may be performed by way of mounting to a mobile platform, in the form of a completely or partially submersible, or buoyant, marine vehicle. The mobile platform may be autonomous, and controlled, for example, by an onboard or remote control system, as previously described.

Figure 5:
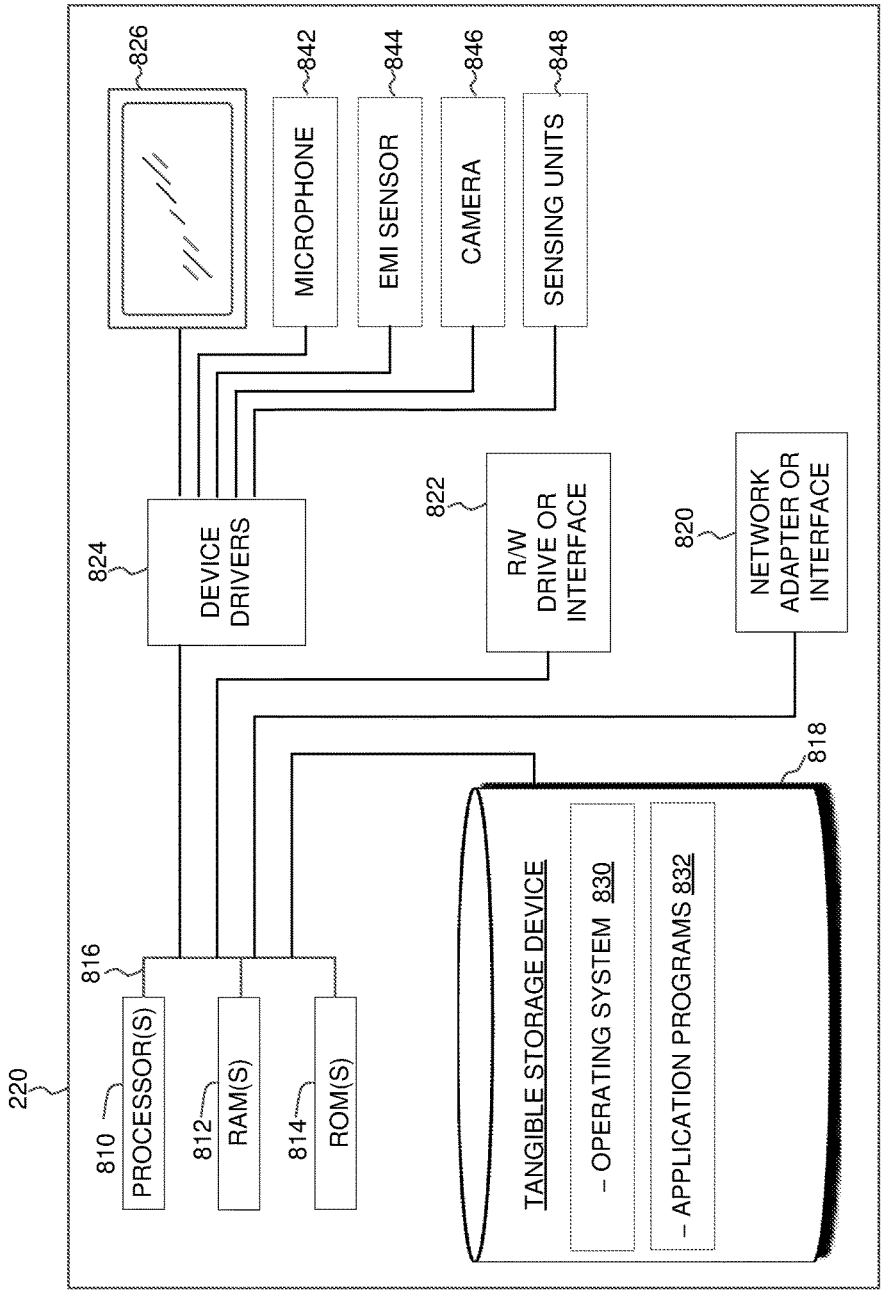
FIG. 5 is a block diagram depicting a sensing device, in accordance with an embodiment of the present invention.

As depicted in FIG. 5, mobile phone SU 220 represents any type of mobile phone, and may include several computing resources, such as processor(s) 810, RAM(S) 812 and ROM(S) 814, and one or more tangible storage devices 818. SU 220, and may also include a read/write (R/W) interface 822, for example, a USB port, to read from and write to external computing devices or one or more portable computer-readable tangible storage devices such as a CD-ROM, DVD, memory stick, magnetic disk, optical disk or semiconductor storage device. The apps and programs 832 and the user environment definitions 834 can be stored on the external computing devices or one or more of the portable computer-readable tangible storage devices, read via the R/W interface 822 and loaded onto the computer-readable tangible storage device 818. Mobile phone SU 220 may further include network and communication adapters or interfaces 820. These interfaces and adapters may allow communication over various networks and protocols, for example, TDMA, CDMA, GSM, and/or other mobile telephone standards, WiFi, Ethernet, Bluetooth, NFC, and other infrastructure based and ad hoc wireless protocols.

Figure 6:
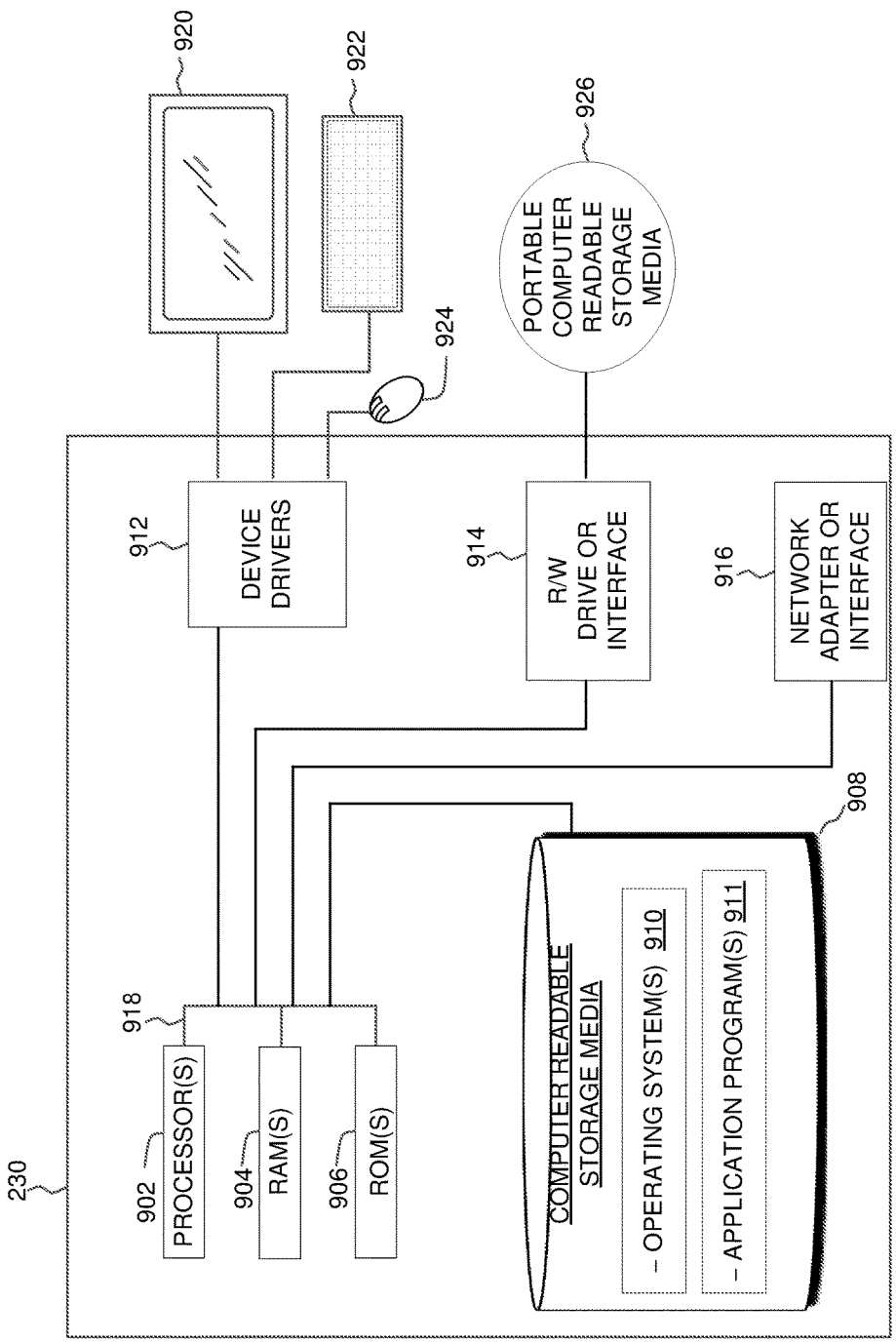
FIG. 6 is a block diagram depicting a computing device, in accordance with an embodiment of the present invention.

As depicted in FIG. 6, Server 230 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, machine operation monitoring system 200, as depicted in FIG. 2, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 230 may also include a R/W drive or interface 914 to read from and write to one or more portable computer readable storage media 926. Application programs 911 on server 230 may be stored on one or more of the portable computer readable storage media 926, read via the respective R/W drive or interface 914 and loaded into the respective computer readable storage media 908. Server 230 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on server 230 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. Server 230 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

Server 230 can be a standalone network server, or represent functionality integrated into one or more network systems. In general, server 230 can be a laptop computer, desktop computer, specialized computer server, or any other computer system known in the art. In certain embodiments, server 230 represents computer systems utilizing clustered computers and components to act as a single pool of seamless resources when accessed through a network, such as a LAN, WAN, or a combination of the two. This implementation may be preferred for data centers and for cloud computing applications. In general, server 230 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
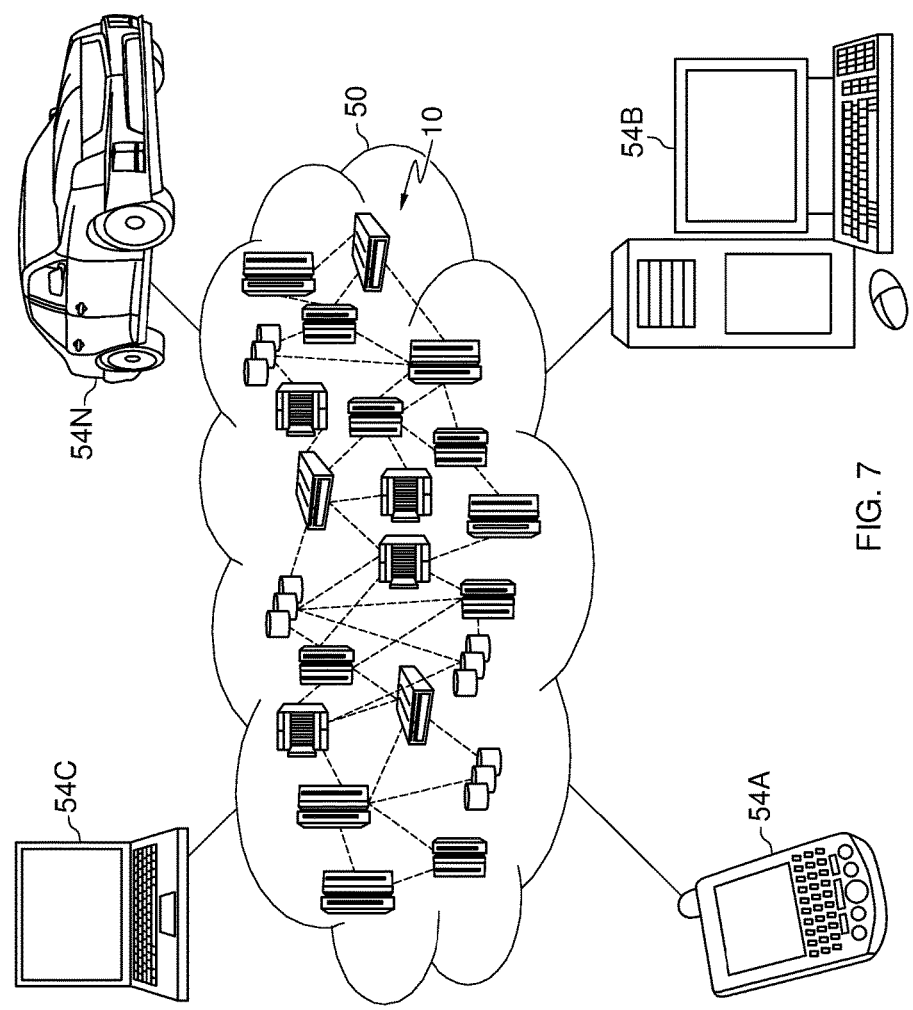
FIG. 7 depicts a cloud computing environment, in accordance with an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
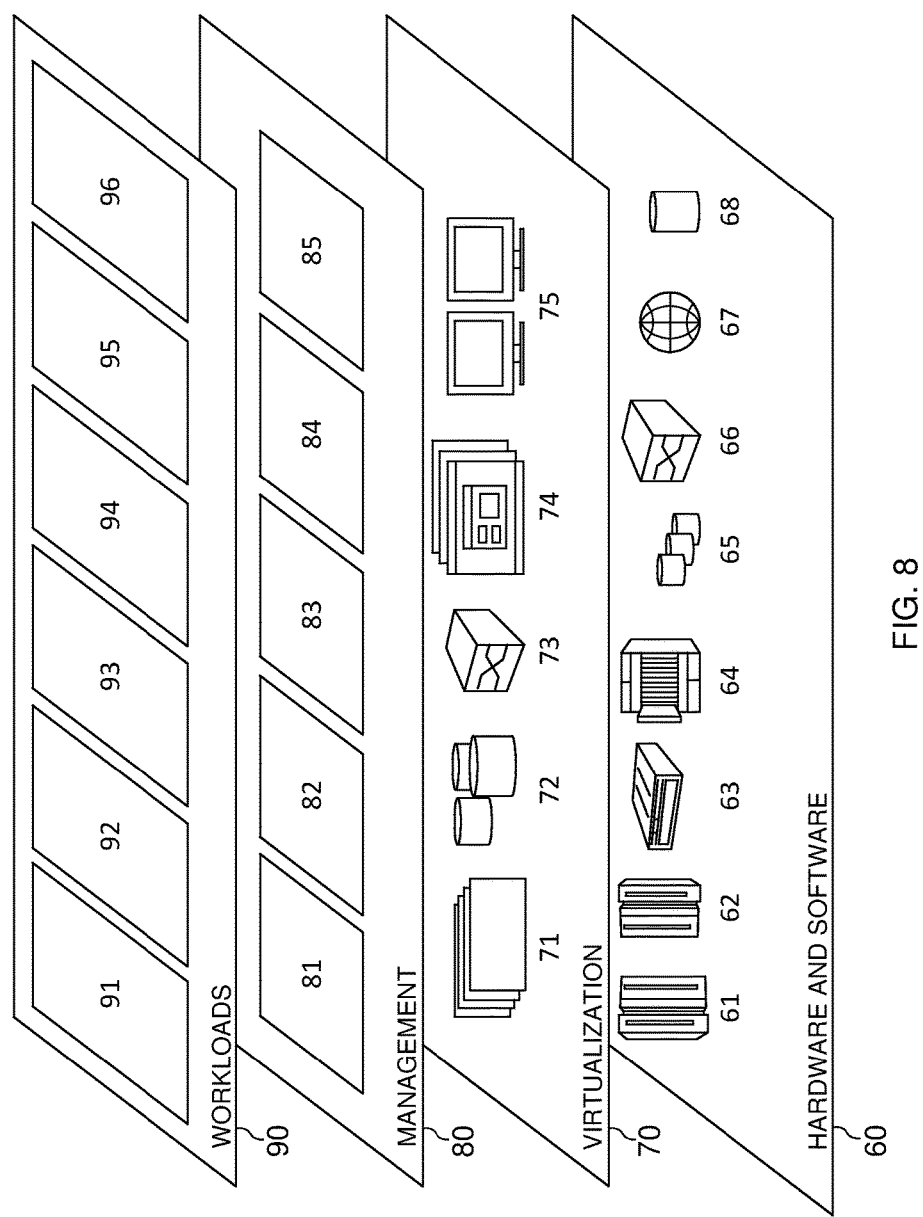
FIG. 8 depicts abstraction model layers, in accordance with an embodiment of the present invention.

Referring now to FIG. 8, a set of functional abstraction layers provided by cloud computing environment 50 (FIG. 1) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine operation monitoring 96.

Machine operation monitoring 96 may include functionality enabling the cloud computing environment to be used to receive and analyze signal data as from machine-emitted signals of machines being monitored, and to subsequently determine conditions of each of the machines being monitored. Machine operation monitoring 96 may also enable the cloud computing environment to be used to determine and effect corrective action on any particular machine, whose condition has been determined to require such corrective action.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for monitoring a plurality of machines located in an operating environment, the method comprising:
   receiving, from a sensing device over a network to a computing system, a first acoustic signal readings and their respective detecting locations;
   generating, by the computing system, a first acoustic signal spatialization map containing characteristic data signatures, based on the first acoustic signal readings and their respective detecting locations, each of the characteristic data signatures being associated with one or more of the plurality of machines;
   receiving, from the sensing device over the network to the computing system, a second acoustic signal readings and their respective detecting locations;
   generating, by the computing system, a second acoustic signal spatialization map containing characteristic data signatures, based on the second acoustic signal readings and their respective detecting locations, each of the characteristic data signatures being associated with one or more of the plurality of machines;
   determining, by the computing system, that there are one or more differences, that exceed a predetermined threshold value, between one or more characteristic data signatures in the first acoustic signal spatialization map and corresponding one or more characteristic data signatures in the second acoustic signal spatialization map;
   identifying at least one of the plurality of machines that are associated with the determined differences;
   identifying, by the computing system, a corrective action to perform on a machine of the plurality of machines, based on the determined one or more differences in the generated first and second acoustic signal spatialization maps; and
   transmitting, by the computing system, to a corrective action module in the operating environment, commands to cause the corrective action module to perform the identified corrective action.

2. The method of claim 1, further comprising:
   taking, by one or more sensors of the sensing device at a first time and at a first plurality of locations in the operating environment, first acoustic signal readings of acoustic emissions emitted by the plurality of machines, and transmitting the first acoustic signal readings to the computing system; and
   taking, by the one or more sensors of the sensing device at a second time and at a second plurality of locations in the operating environment, second acoustic signal readings of acoustic emissions emitted by the plurality of machines, and transmitting the second acoustic signal readings to the computing system.

3. The method of claim 1, further comprising:
   executing, by the corrective action module, the corrective action on the machine of the plurality of machines.

4. The method of claim 1, wherein the sensing device is a device selected from a group consisting of: a smart phone, a sound level meter, and a sound dosimeter.

5. The method of claim 2, wherein the one or more sensors include at least one sensor selected from a group comprising: a piezoelectric sensor, a capacitive sensor, a fiber optic sensor, and a microelectrical mechanical system sensor.

6. The method of claim 2, wherein
   taking, by one or more sensors of the sensing device at the first time and at the first plurality of locations in the operating environment, and taking, by one or more sensors of the sensing device at the second time and at the second plurality of locations in the operating environment, further comprises:
   mounting the sensing device to a mobile platform and positioning and orienting the sensing device at the first and second plurality of locations by the mobile platform.

7. The method of claim 1, wherein the first acoustic signal reading detecting locations comprise between 6 and 60 locations, and the second acoustic signal reading detecting locations comprises two or more locations.

8. The method of claim 1, wherein generating, by the computing system, the first acoustic signal spatialization map and the second acoustic signal spatialization map further comprises:
   generating, by the computing system, the characteristic data signatures by performing one or more from a group consisting of: transforms, sparse approximation algorithms, and statistical measurements.

9. The method of claim 8, wherein
   the one or more transforms is selected from a group consisting of: Laplace transform, Fourier transform (FT), fast Fourier Transform (FFT), discrete Fourier transform (DFT), discrete sine transform (DST), discrete cosine transform (DCT), discrete wavelet transform (DWT), Mel-frequency cepstrum (MFC), Mel-frequency cepstral coefficients (MFCCs), linear prediction cepstral coefficients (LPCCs), and analog-to-information (ATI);

the one or more sparse approximation algorithms is selected from a group consisting of: matching pursuit, basis pursuit, and orthogonal matching pursuit; and the one or more statistical measurements is selected from a group consisting of: short-time energy, short-time average zero-crossing rate, and time-domain harmonics amplitudes.

10. A computer system for monitoring a plurality of machines located in an operating environment, the computer system comprising:

one or more computer processors, one or more computer-readable storage media, and program instructions stored on one or more of the computer-readable storage media for execution by at least one of the one or more processors, the program instructions, when executed by the at least one of the one or more processors, causing the computer system to perform a method comprising:

receiving, from a sensing device over a network to a computing system, a first acoustic signal readings and their respective detecting locations;

generating, by the computing system, a first acoustic signal spatialization map containing characteristic data signatures, based on the first acoustic signal readings and their respective detecting locations, each of the characteristic data signatures being associated with one or more of the plurality of machines;

receiving, from the sensing device over the network to the computing system, a second acoustic signal readings and their respective detecting locations;

generating, by the computing system, a second acoustic signal spatialization map containing characteristic data signatures, based on the second acoustic signal readings and their respective detecting locations, each of the characteristic data signatures being associated with one or more of the plurality of machines;

determining, by the computing system, that there are one or more differences, that exceed a predetermined threshold value, between one or more characteristic data signatures in the first acoustic signal spatialization map and corresponding one or more characteristic data signatures in the second acoustic signal spatialization map;

identifying at least one of the plurality of machines that are associated with the determined differences;

identifying, by the computing system, a corrective action to perform on a machine of the plurality of machines, based on the determined one or more differences in the generated first and second acoustic signal spatialization maps; and transmitting, by the computing system to a corrective action module in the operating environment, commands to cause the corrective action module to perform the identified corrective action.

11. The computer system of claim 10, wherein the method further comprises:

taking, by one or more sensors of the sensing device at a first time and at a first plurality of locations in the operating environment, first acoustic signal readings of acoustic emissions emitted by the plurality of machines, and transmitting the first acoustic signal readings to the computing system; and taking, by the one or more sensors of the sensing device at a second time and at a second plurality of locations in the operating environment, second acoustic signal readings of acoustic emissions emitted by the plurality of machines, and transmitting the second acoustic signal readings to the computing system.

12. The computer system of claim 10, wherein the method further comprises:

executing, by the corrective action module, the corrective action on the machine of the plurality of machines.

13. The computer system of claim 10, wherein the sensing device is a device selected from a group consisting of: a smart phone, a sound level meter, and a sound dosimeter.

14. The computer system of claim 11, wherein the one or more sensors include at least one sensor selected from a group comprising: a piezoelectric sensor, a capacitive sensor, a fiber optic sensor, and a microelectrical mechanical system sensor.

15. The computer system of claim 11, wherein the method of taking, by one or more sensors of the sensing device at the first time and at the first plurality of locations in the operating environment, and taking, by one or more sensors of the sensing device at the second time and at the second plurality of locations in the operating environment, further comprises:

mounting the sensing device to a mobile platform and positioning and orienting the sensing device at the first and second plurality of locations by the mobile platform.

16. The computer system of claim 10, wherein the first acoustic signal reading detecting locations comprise between 6 and 60 locations, and the second acoustic signal reading detecting locations comprises two or more locations.

17. The computer system of claim 10, wherein the method of generating, by the computing system, the first acoustic signal spatialization map and the second acoustic signal spatialization map, further comprises:

generating, by the computing system, the characteristic data signatures by performing one or more from a group consisting of: transforms, sparse approximation algorithms, and statistical measurements.

18. The computer system of claim 17, wherein the one or more transforms is selected from a group consisting of: Laplace transform, Fourier transform (FT), fast Fourier Transform (FFT), discrete Fourier transform (DFT), discrete sine transform (DST), discrete cosine transform (DCT), discrete wavelet transform (DWT), Mel-frequency cepstrum (MFC), Mel-frequency cepstral coefficients (MFCCs), linear prediction cepstral coefficients (LPCCs), and analog-to-information (ATI);

the one or more sparse approximation algorithms is selected from a group consisting of: matching pursuit, basis pursuit, and orthogonal matching pursuit; and the one or more statistical measurements is selected from a group consisting of: short-time energy, short-time average zero-crossing rate, and time-domain harmonics amplitudes.

\* \* \* \* \*